United States Patent
Han et al.

(10) Patent No.: US 7,136,986 B2
(45) Date of Patent: Nov. 14, 2006

(54) APPARATUS AND METHOD FOR CONTROLLING FLASH MEMORIES

(75) Inventors: Sang Wook Han, Seongnam-si (KR); Hee Seong Kim, Suwon-si (KR)

(73) Assignee: Ramos Technology Co., Ltd., Suwon-si (KR)

( * ) Notice: Subject to any disclaimer, the term of this patent is extended or adjusted under 35 U.S.C. 154(b) by 496 days.

(21) Appl. No.: 10/727,311

(22) Filed: Dec. 1, 2003

(65) Prior Publication Data

US 2004/0111583 A1 Jun. 10, 2004

(30) Foreign Application Priority Data

Nov. 29, 2002 (KR) .................. 10-2002-0075231
Dec. 6, 2002 (KR) .................. 10-2002-0077392

(51) Int. Cl.
G06F 12/02 (2006.01)
(52) U.S. Cl. .................. 711/203; 711/103; 711/156; 711/165
(58) Field of Classification Search .................. 711/203, 711/165, 103, 156

See application file for complete search history.

(56) References Cited

U.S. PATENT DOCUMENTS 6,742,078 B1 *   5/2004  Chien et al. .................. 711/103
6,771,313 B1 *   8/2004  Haruki .................. 348/231.1
6,792,501 B1 *   9/2004  Chen et al. .................. 711/103
2001/0012222 A1 *   8/2001  Terasaki .................. 365/200

* cited by examiner

Primary Examiner—Hiep T. Nguyen
(74) Attorney, Agent, or Firm—Marger Johnson & McCollom, P.C.

(57) ABSTRACT

In accordance with an embodiment of the present invention, control device and method are disclosed for reducing unnecessary data backup and restoring operations and increasing data read and write speed in a flash memory. The method includes writing data received from the host system to the flash memory; moving valid data in the basic block to the first link block when a use ratio of the first link block is greater than a reference value; and moving valid data in the first link block to the second link block when a use ratio of the first link block is less than the reference value. The control device includes means for simultaneously enabling, when data received from a host system is two or more sector data for different memory units, so that the two sector data are programmed concurrently into the enabled memory units; and means for enabling, when data received from the host system is one sector data, one memory unit addressed to receive the sector data and for programming the received sector data into the memory unit.

11 Claims, 15 Drawing Sheets

APPARATUS AND METHOD FOR CONTROLLING FLASH MEMORIES

CLAIM OF PRIORITY

This application makes reference to, incorporates the same herein, and claims all benefits accruing under 35 U.S.C. §119 from my applications: APPARATUS AND METHOD FOR CONTROLLING FLASH MEMORIES filed with the Korean Intellectual Property Office on 29 Nov. 2002 (Ser. No. 2002-75231); and CONTROL METHOD AND APPARATUS FOR OPERATIONS OF FLASH MEMORY SYSTEM filed with the Korean Intellectual Property Office on 6 Dec. 2002 (Ser. No. 2002-77392).

BACKGROUND OF THE INVENTION

1. Technical Field

This invention relates generally to semiconductor technology and more particularly to control method and apparatus for flash memory devices.

2. Related Art

As data storage capacity required in various mobile electronics and embedded devices increases, demands for flash memory type EEPOMs (Electrically Erasable Programmable Read Only Memory) is on the increase. Flash memory is used for easy and fast information storage in devices like digital cameras, portable MP3 players and home video game consoles. It is used more as a hard drive than as RAM. Advantages of the flash memory among other include: cheaper than SRAM; faster than hard disk, no moving part, and maintaining data without power supply. Typical applications of flash memory include PCMCIA flash-storage cards, MP3 players, and digital voice recorders. Key application requirements are high density, low cost per byte, and tolerance for storage errors. Flash memory stores program code for an embedded processor, such as a high-end 32-bit, RISC CPU used in a router or a DSP used in a cellular phone.

In a flash memory, a write or program operation is always preceded by an erase operation even when the location to which data is to be written is a part of page or sector in a memory block. Further, flash memory has different erase size and write (or program) size. Accordingly, writing data into the flash memory is time-consuming and the life span of the memory decreases according to an increase of erase-write cycles.

In conventional flash memory, the erase operation is performed in a various methods. For example, the memory is divided into blocks (or sectors) that are each separately erasable, but only one at a time. After selecting the desired block and temporarily moving data in such block to RAM, the designated area is erased. The data in RAM is then restored into the memory by programming back into the device. In more improved prior art, the flash memory is divided into sectors where all cells within each sector are erasable together. Each sector can be addressed separately and selected for erase. This makes possible to select any combination of sectors for erase together and allows for a faster system erase.

However, in prior arts there still exist additional and unnecessary operations, which causes lowering of the performance the memory system and delay in operational speed. For instance, write operation of the conventional flash memory as shown in FIG. 1 is as follows.

(1) Flash memory controller 20 receives from a host 10 a logical address LA for designating location to which data is to be written.

(2) Memory controller 20 translates LA into a physical address PA.

(3) Data back-up to a buffer perfroms to areas in a memory block that includes the translated PA but excepting data to be written. For example, the memory array 30 in FIG. 1 has a plurality of memory units or banks (30A, 30B, . . . , 30N), with each unit having a plurality of memory blocks (30A1, 30A2, . . . , 30AM; 301B, 30B2, . . . , 30BM; . . . ; 30N1, 30N2, . . . , 30NM), and each of the memory block comprises a number of sectors or pages 32. Supposing that a physical address to which data is to be written includes a page 36A in a first memory block 30A1 of the first memory 30A as well as a page 36B in a second memory block 30B2 of the second memory 30B, data in pages to which no data is written (i.e., pages 34A and 34B) are moved to the data buffer and data backup is carried out before writing data into the pages 36A and 36B.

(4) Erase blocks that includes the pages addressed by the logical address (in this case, blocks 30A1 and 30B2).

(5) Memory controller 20 receives data to be written from the host 10.

(6) Memory controller 20 programs data delivered from the host 10 into the location (in this case pages 36A and 36B) addressed by the logical address.

(7) Data backed-up at the previous step (3) is restored from the data buffer in the memory controller 20 to the original location (e.g., pages 34A and 34B).

In this conventional system, the operations for erasing all the appropriate blocks and for programming data into the designated locations are inevitable. However, such operations of data backup and data restoration are additional ones arising from the properties of the flash memory. As a result, particularly in case that program size and erase size (e.g., memory block) are greatly different, lots of time should be consumed in the additional data backup and restoring operations. Moreover, the data backup operation entails a data read operation.

One of most significant technical challenges in flash memory is to increase the data read and write speed. For doing this, techniques such as for optimization of software or increase of frequency (e.g., speed-up the operation of a memory control device that processes data from the host system, or improve the speed of an interface between the memory control device and the flash memory), or parallel interconnection of multiple flash memories have been employed in prior art. However, the prior methods have limitations due to e.g., the increase of current and the construction of the host system or the flash memory control system.

SUMMARY OF THE INVENTION

The purpose of this invention is to improve the operational speed and increase the lifetime of a flash memory.

Other purpose of this invention is to increase write/read speed of a flash memory.

Another purpose of this invention is reduce time in accessing each flash memory.

According to one aspect of the present invention, method for controlling a flash memory includes receiving logical address from a host system, translating the logical address into a physical address, and writing data into a location (e.g., a basic block) designated by the physical address. Here, given the storage location (basic block) of the addressed flash memory is linked and there already written with valid data, valid data in the storage location is moved to the linked location when a use ratio of the linked location is greater than a reference value. Meanwhile, if the use ratio of the linked location is less than the reference value, valid data in the storage location is moved to another linked location. The reference value is so determined that time in moving data becomes minimized. The operation of data movement may performs during the host system is in an idle state.

According to other aspect of the present invention, control device is to control a flash memory and transfers data between the flash memory and the host system. The flash memory comprises a plurality of memory blocks, with each memory block having a plurality of pages/sectors. Data writing operation by the host system to the flash memory performs in one sector unit, an erase operation to the flash memory performs in one block unit, and a plurality of memory blocks includes basic blocks addressed by physical addresses corresponding to logical addresses transmitted from the host system, first link blocks to which the basic blocks are linked, and second link blocks to which the first link blocks are linked. The control device includes means for writing data received from the host system to the flash memory, means for moving valid data in the basic block to the first link block when a use ratio of the first link block is greater than a reference value, and means for moving valid data in the first link block to the second link block when a use ratio of the first link block is less than the reference value. When valid data in the basic block is moved to the first link block, BiT/link table and ST table of the basic block and the first link block are revised, while if the valid data in the first link is moved to the second link block, BiT/link table and ST table of the basic, first and second link blocks are revised.

According to still another aspect of the present invention, an apparatus for controlling a flash memory is connected between a flash memory array and a host system and transmits data in a sector unit to the flash memory array. The flash memory array includes a plurality of memory banks, with each memory bank comprised of a plurality of memory units, each memory unit comprised of a plurality of memory blocks, each memory block having a plurality of pages, each page including one or more sectors. The control apparatus includes: means for simultaneously enabling, when data received from the host system is two or more sector data for different memory units, said memory units addressed to receive said sector data, so that said two sector data are programmed concurrently into the enabled memory units; and means for enabling, when data received from the host system is one sector data, one memory unit addressed to receive said sector data and for programming the received sector data into the memory unit.

According to still another aspect of the present invention, an apparatus for controlling a flash memory is connected between a flash memory array and a host system and transmits data in a sector unit to the flash memory array. The flash memory array includes a plurality of memory banks connected in parallel, each memory bank including a plurality of memory units, each memory unit including a plurality of memory blocks, each memory block having a plurality of pages, each page including one or more sectors. The apparatus includes data interface pins of such number that can be connected to the parallel memory banks. The flash memory controlling apparatus and the flash memory array have in common a control signal interface pin, and the data interface pin and a chip selection signal pin are connected separately between the flash memory control apparatus and the plurality of memory banks of flash memory array.

According to still another aspect of the present invention, method for controlling a flash memory includes steps of: receiving a logical address for the flash memory from a host system; translating the received logical address into a physical address; determining the number of sector that is to be written into the flash memory by the host system; enabling one flash memory bank corresponding to a bank calculation result, said bank calculation being performed after receiving one sector data when the number of sector is '1'; enabling two flash memory banks when the number of sector is '2' and two sector data is received; and performing a flash write operation to a memory block of the enabled memory bank, said memory block being addressed by the physical address.

These and other features and advantages will be more clearly understood from the following detailed description taken in conjunction with the accompanying drawings. It is important to point out that the illustrations may not necessarily be drawn to scale, and that there may be other embodiments of this invention which are not specifically illustrated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION

First Embodiment

Figure 1:
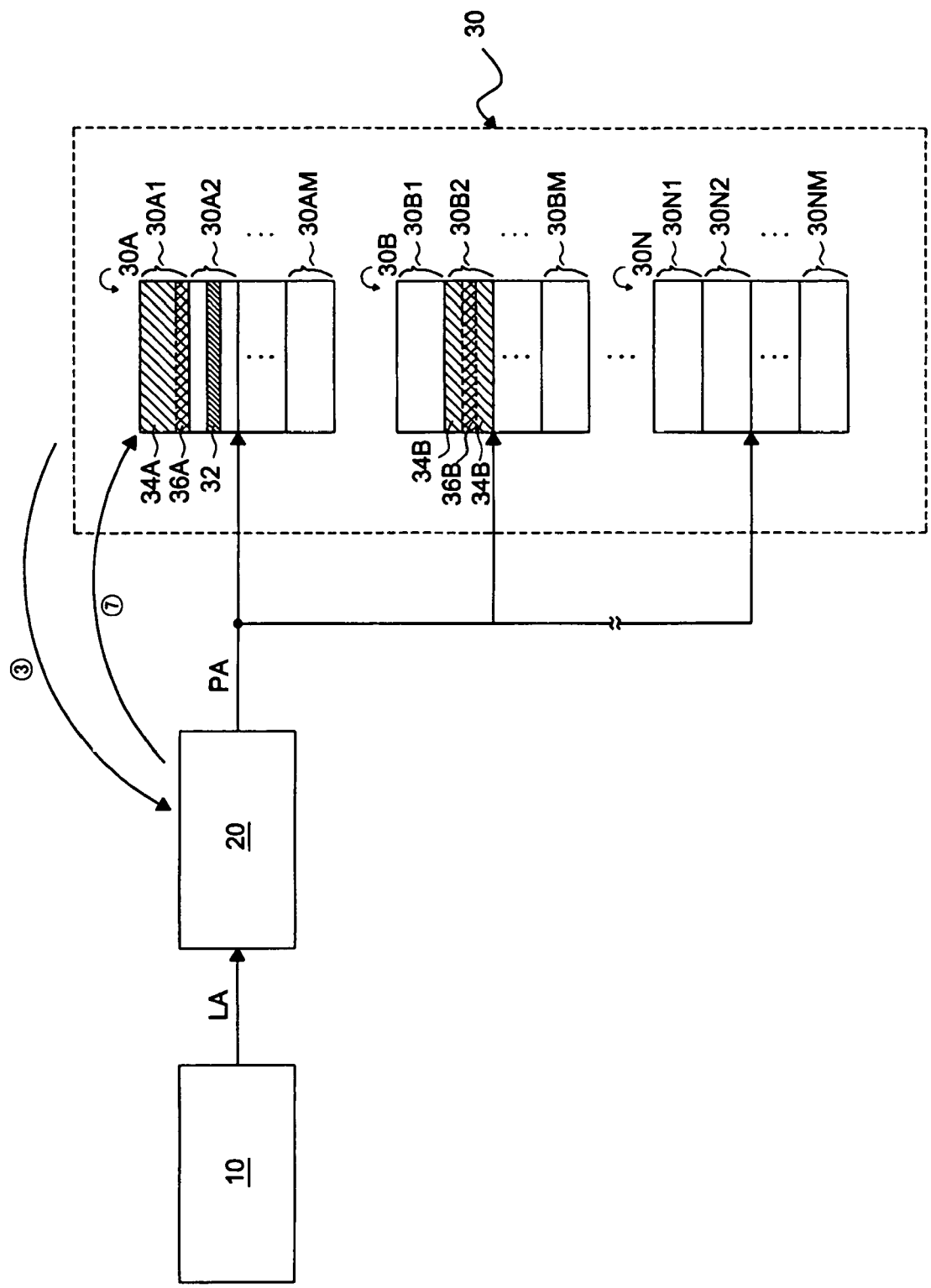
FIG. 1 is a block diagram for showing a prior write operation of a flash memory system.
Figure 2:
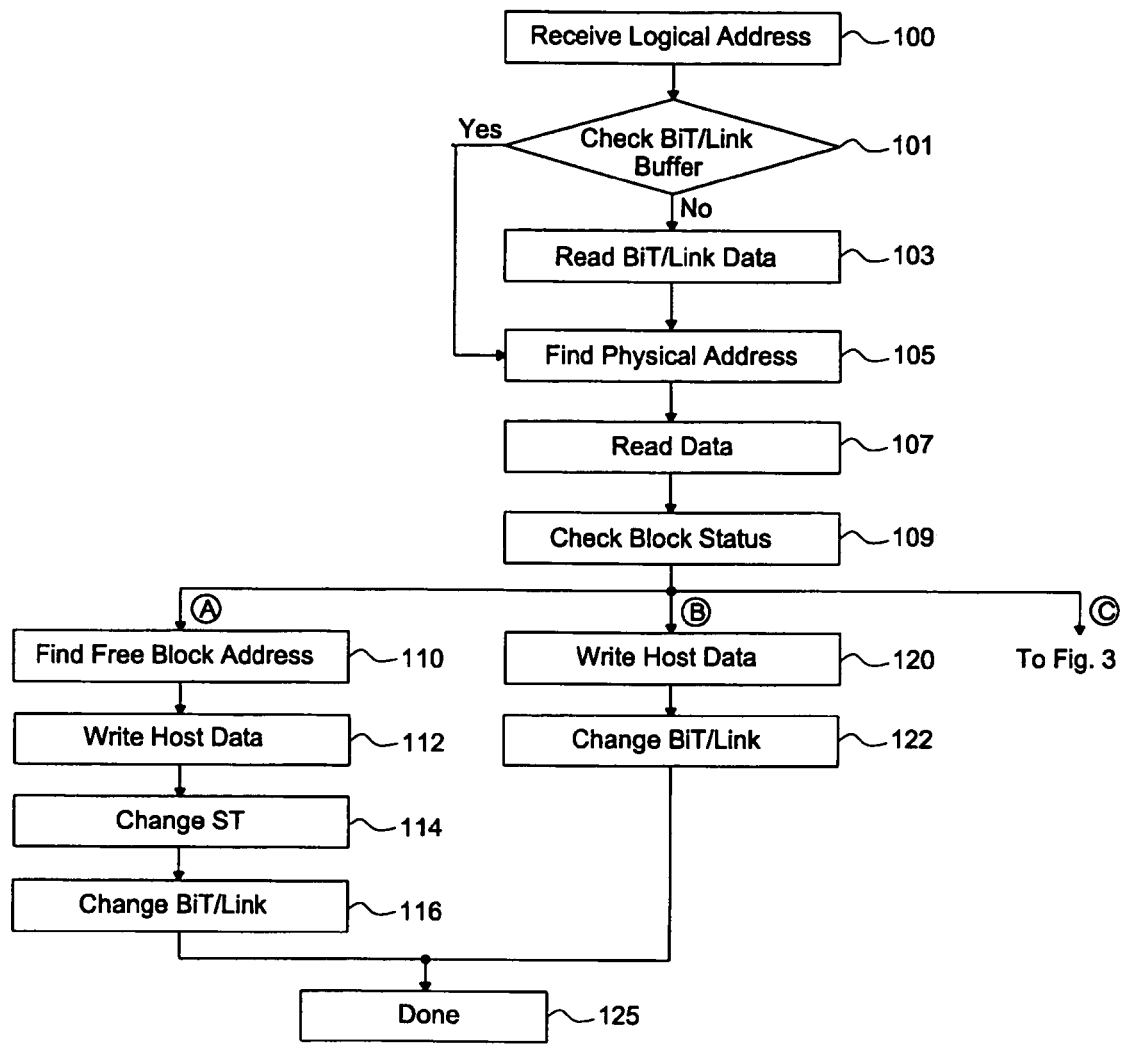
FIG. 2 illustrates a process of a write operation according to the present invention.
Figure 3:
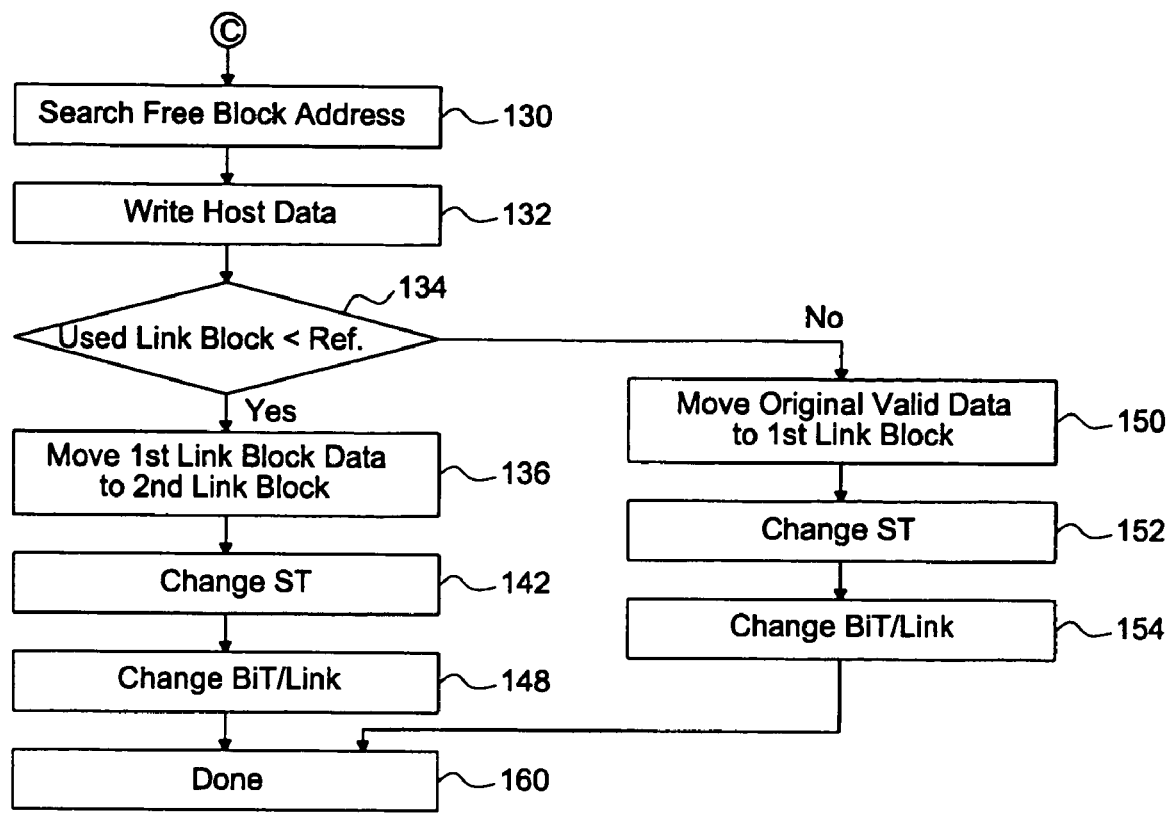
FIG. 3 illustrates a detailed process of the write operation where a linked block is not free block.

FIGS. 2 and 3 illustrate the overall process of a control method for flash memory according to the present invention. The process shown in FIGS. 2 and 3 is for the write operation of flash memory. First, an address to which data is to be written is received from a host system at step 100. The host system may include PCs and mobile electronics such as digital cameras, MP3 players, and data is delivered in a unit of a sector or a page. The address received from the host system is logical address. At step 101, logical address is examined in a BiT (Block information Table)/link buffer. The BiT/link buffer means a buffer that maintains link information, movement information of the erase block, and address of flash memory block in a memory (e.g., SRAM) within a controller for controlling the operations of a flash memory. When information on the logical address can not be found in the BiT/link buffer exists, the process goes directly to step 105 for searching logical address based on the information, and if not, step 103 for reading relevant data from BiT/link table in the flash memory is performed before step 105 where the physical address is found based on above data.

After the conversion of logical address to physical address at step 105, data to be written is received from a host (step 107), and the status of memory block corresponding to the physical address is examined (step 109). According to the examined status of the memory block, the process divided into three branches: the block is not linked (branch A); the block is linked and the linked block is free block (i.e., area to which data can be written without prior erasing operation) (branch B); and the block is linked and other data has been written in the linked block (branch C).

In case of branch A where the flash memory block designated by the physical address is not linked, a free block address is searched (step 110) and host data is programmed in the free block (step 112). Since data is written in the free block, the status table (ST) for the block is changed from 'free' to 'used' (step 114). When all bits in ST table, which represent 'valid data written' and 'invalid data written' are '0', this indicates that the corresponding block is a 'free block'. Accordingly, at the ST table changing step 114, the bit representing valid data written block is changed to '1' from '0'. After the change of ST table, a link address and a link status are written in the BiT/link table corresponding to the physical address so that BiT/link table is changed (step 116). In other words, a link address indicating the location of the link block in BiT/link table is written and a bit of the link information corresponding to the page to which data is written is changed to e.g., '1'.

In case of branch B, host data is written to the free block designated by the link address (step 120), BiT/link information for the block is changed (step 122). Here, the link address in BiT/link table is not changed, while the information of the linked page is changed.

In case of branch C, another free block address is searched (step 130) and host data is written to the searched free block (second link block) (step 132) as shown in FIG. 3, because the linked block (i.e., first link block) already has other valid data written. After the data writing, it is determined if the use ratio of the first link block (the occupying ratio of an area where valid data is written in the whole area of a single block) is greater than a predetermined reference value (step 134). Here, the reference value is so determined that time in moving data between other blocks becomes minimum. The reference value may be ½. It should noted that the present invention is not limited to the value of ½.

When the use ratio of the first link block is less than the reference value at step 134, data on the first link block is moved to the second link block (step 136). ST table for the first and second link blocks is modified (step 142), and BiT/link information of basic block is revised (step 148).

When the use ratio of the first link block is equal to or greater than the reference value at step 134, valid data in the basic block corresponding to the physical address converted at step 105 is moved to the first link block (step 150) and the ST table changing step 152 and BiT/link table changing step 154 is carried out. For instance, ST table of the basic block is changed to 'dirty' (invalid data written) from 'used' (valid data written), and the link address in BiT/link table is changed from the second link block to the first link block.

As seen from the operation of the flash memory and its control sequence, the present invention does not employ backup and restoring operations occurred in all the writing or programming operation of the conventional flash memory system and thus the speed of writing operation of flash memory can be greatly improved. Further, data movement is selectively controlled according to the use ratio of the block in flash memory and the efficiency of the operations for data backup and restoring are maximized.

Figure 4:
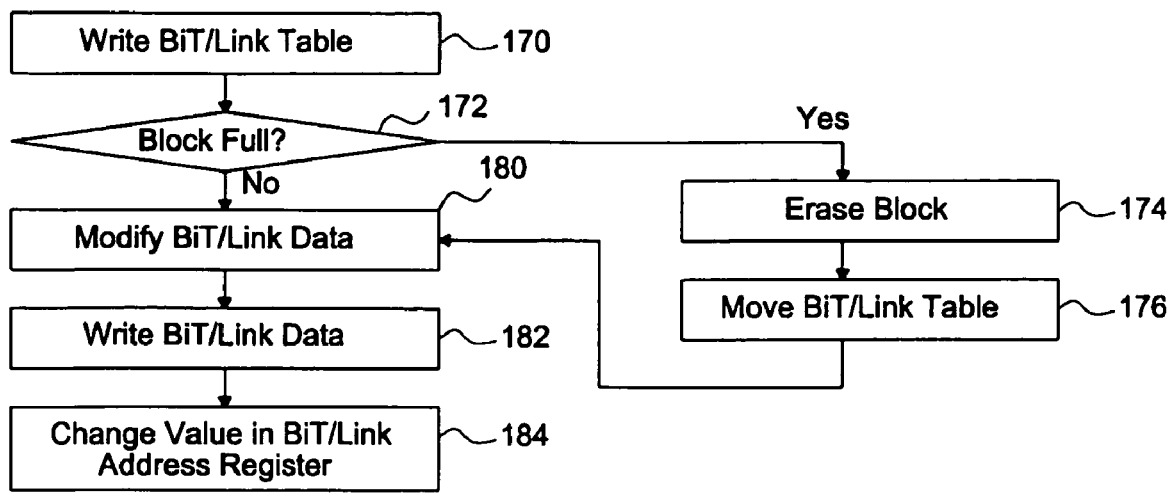
FIG. 4 illustrates a BiT/Link table update operation according to the present invention.

FIG. 4 illustrates an operation for updating BiT/link table. The updating operation of BiT/link table in a flash memory writing operation explained above with reference to FIG. 3 is writing data to the BiT/link table (step 170). After the data writing, it is determined if the block corresponding to the BiT/link table is full with data (step 172). When the BiT/link block is not full of data, BiT/link data on a SRAM of the flash memory operational controller is revised (step 180), BiT/link data of the flash memory is revised and written (step 182), and the value of a BiT/link address register is revised (step 184). Meanwhile, when the block is determined to be full of data at step 172, the block is erased (step 174) and the sequence proceeds to a BiT/link data revision step 180 after the movement of BiT/link table (step 176).

Figure 5:
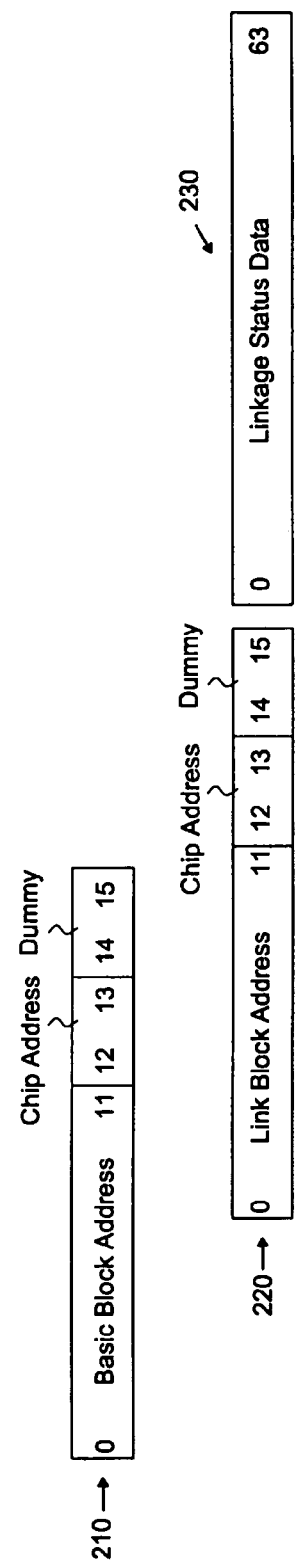
FIG. 5 shows a data structure of BiT information and link information.

FIG. 5 shows the structure of Bit/link information, which includes an information structure 210 for the basic block, an information structure 220 for the link block, and an information structure 230 for the linkage status data. The basic block information structure 210 may consist of basic block addresses of 12-bit data from bit '0' to '11', chip addresses for the basic block represented by bit '11' and '12', and dummy bits of bit '14' and '15'. Similarly, the link block information structure 220 is comprised of 12-bit link block addresses, chip addresses for the link block, and the dummy bits. Following the link block information structure, linkage status data structure 230 of e.g., 64-bit exists. The linkage status data structure 230 represents which page in a program block is either linked or moved. This example is to express the information structure in a long word. It is also possible to use other bit structure. Given one word representing one block information, eight pages are necessary for 1 G flash memory, while sixteen pages are required for BiT/link information. In the present invention, the same block as the block for user data can be used for storing BiT/link information, and e.g., two blocks can be assigned for the BiT/link table in consideration of data erasing. In this embodiment, three long words are required, but for the convenience of a flash memory operation control program, four long words can be used.

Figure 6:
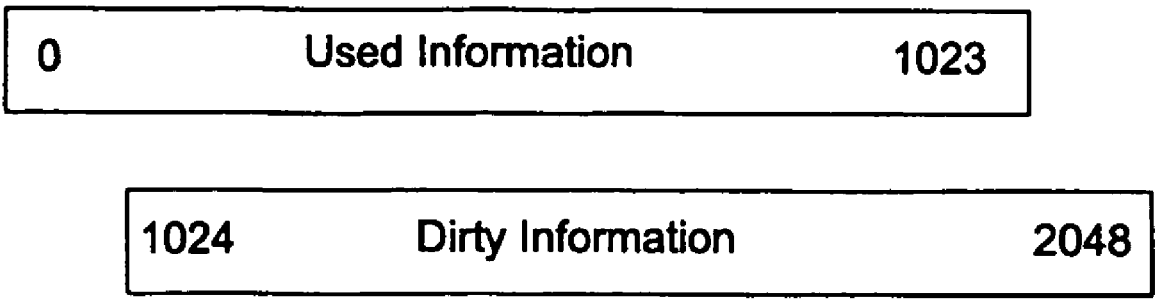
FIG. 6 shows a data structure of ST table.

FIG. 6 shows the information structure of ST table, where upper 1 k bits (i.e., 0~1023) are used for valid data written information (Used) and lower 1 k bits (i.e., 1024~2048) are used for invalid data written information (Dirty). Here, the number of bits is dependent upon the memory capacity and a single bit represents the status of one block. For instance, if the valid data written bit has a value of '1', the corresponding block is indicated as an used block having other data has been written. When both the valid data written bit and invalid data written bit are e.g., '0', this indicates that the corresponding block is the free block. Accordingly, no additional bits for representing the free block are needed.

Though not clearly shown in FIGS. 5 and 6, it is preferable that information pages in BiT/link table and ST table have valid information locations, and at the end of each page is included key values. It is necessary to design the BiT/link table and ST table to minimize the erase cycles. Further, it is preferable to design that the BiT/link and ST tables have information including all the page information that exactly describe the block information of the current flash memory. The valid information locations refers this point. In the first use, the information of the BiT/link table and the BT table is empty and has a value of '0'. This may cause an error in finding correct information. In order to prevent this kind of error, e.g., 32-bit key values may be employed at the end of each page.

Figure 7:
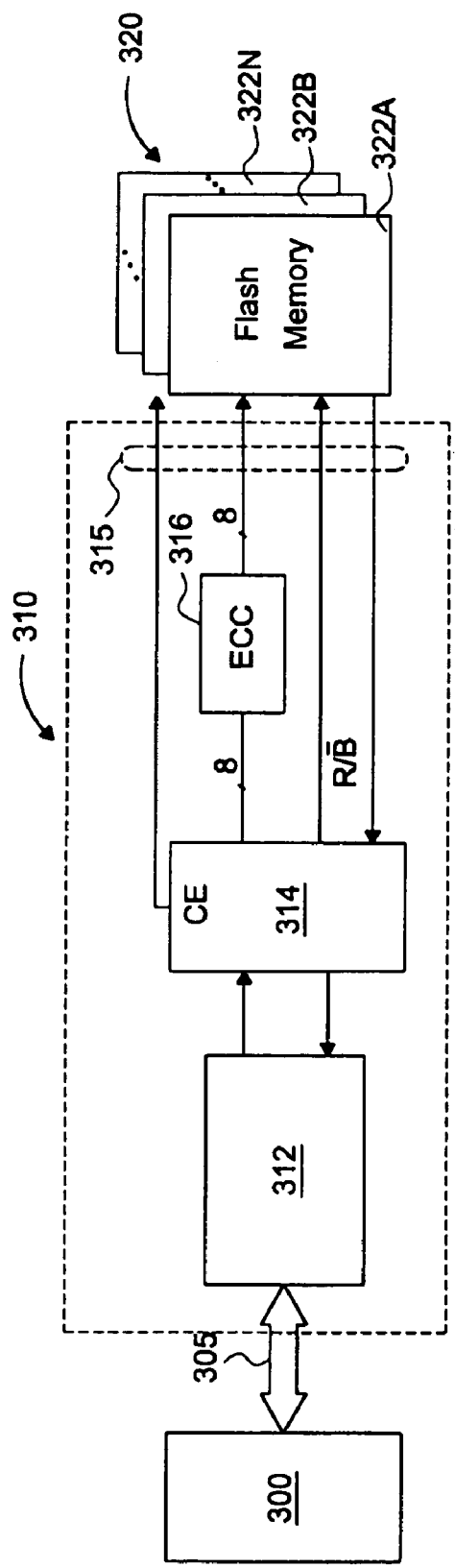
FIG. 7 is a block circuit diagram for showing the overall structure of flash memory system to which the present invention can be applied.
Figure 8:
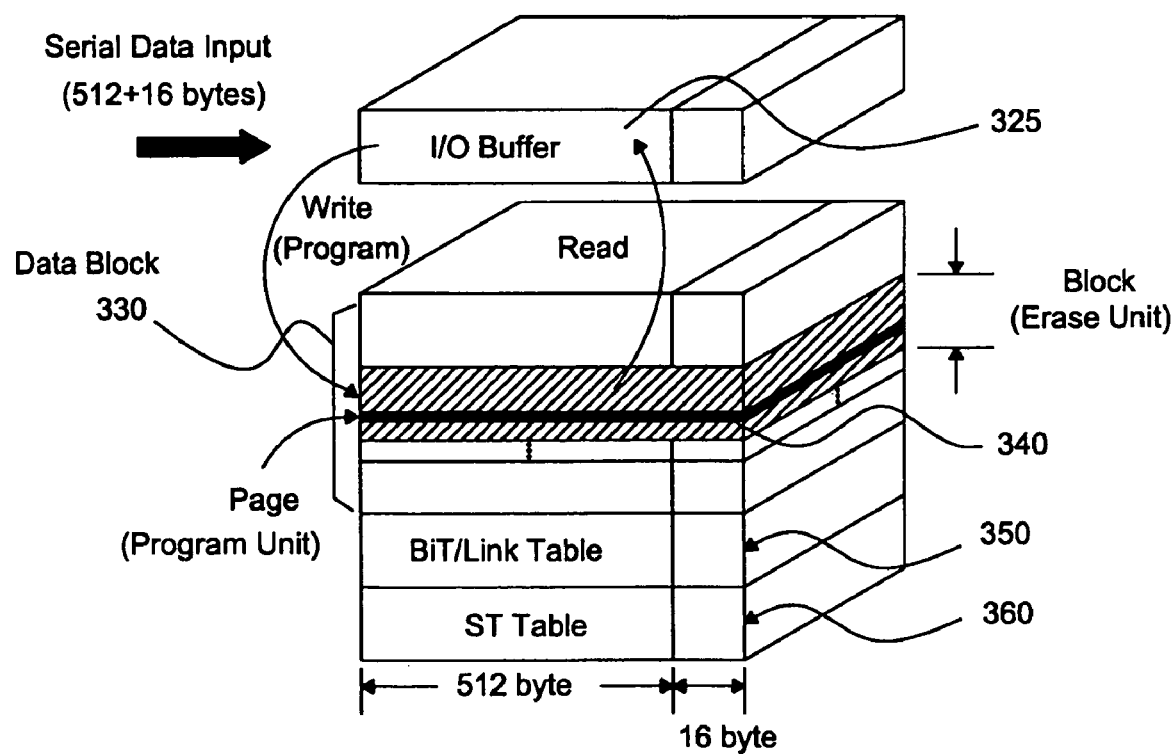
FIG. 8 is a block circuit diagram for illustrating the operational process and data storage structure of a flash memory.

FIGS. 7 and 8 illustrate the overall structure of an apparatus for controlling the operations of a flash memory, and data storage structure and operation of the flash memory according to the present invention, respectively.

A control device for the flash memory operation 310 is connected to a host system 300 through a host bus 305, and transmits and receives data with a flash memory array 320 through a flash bus 315. The control device 310 includes a controller 312, a flash control block 314 and an ECC block 316, and the controller 312 in the control device 310 may include SRAM, data buffer, BiT/link buffer, MMU (Memory Management Unit) and so on. The memory array 320 includes a plurality of memory units 322A, 322B, . . . , 322N. The flash control block 314 provides chip selection signal CE, control signals and I/O signals to the flash memory array 320, and receives status signals (R/B; Ready/Busy). I/O signals such as data, address signals and command signals are, with a time difference, provided to the flash memory.

The flash memories 322 and 324 may have a data storage structure as shown in FIG. 8. A flash memory unit has data blocks 330 comprised of a plurality of (e.g., 1,024 or 2,048) memory blocks. A single memory block has a plurality of (e.g., 64) pages 340. A single data block 330 may have e.g., 512-byte user data area and 16-byte ECC data area. Data (e.g., 512+16 bytes) provided through the ECC 316 from the flash control block 314 may be serially input to an I/O buffer 325 in the flash memory. Fetching data to the pages 340 of the memory block from the I/O buffer 325 is write or program operation, while moving data from the pages to the I/O buffer is read operation. Erase operations are to remove data from a block, and as shown in FIG. 8, the program operation is performed in one page unit while the erase operation is made in one block unit.

Referring to FIG. 8, the data storage structure of the present invention includes a block 350 for the BiT/link table and a block 360 for the ST table. These blocks 350 and 360 may be comprised of two blocks as explained before.

Figure 9:
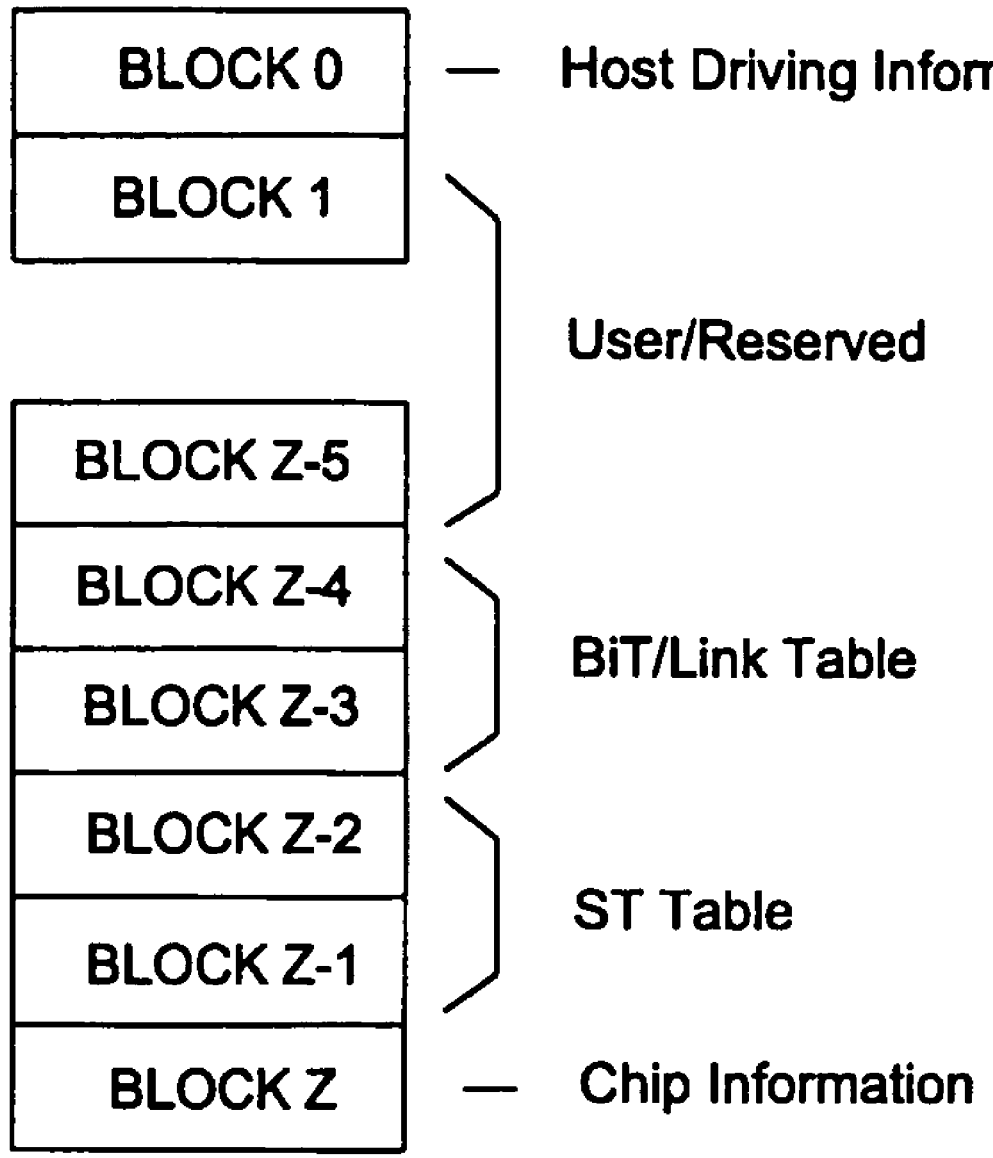
FIG. 9 shows the information structure of a memory block to which the present invention can be applied.

FIG. 9 is a schematic block diagram for illustrating an information structure of memory block to which the present invention can be applied. This embodiment is for a flash memory of over 1 G.

In this embodiment, BLOCK 0 has information for driving a host system, and BLOCK 1 to BLOCK Z-5 are reserved area for user data or other data. The indication 'Z' for a block represents the final block located at the end of a flash unit. BLOCK Z-4 and BLOCK Z-3 are information structure for BiT/link table, BLOCK Z-2 and BLOCK Z-1 are for ST table, and the final block BLOCK Z is for writing chip information.

Figure 10:
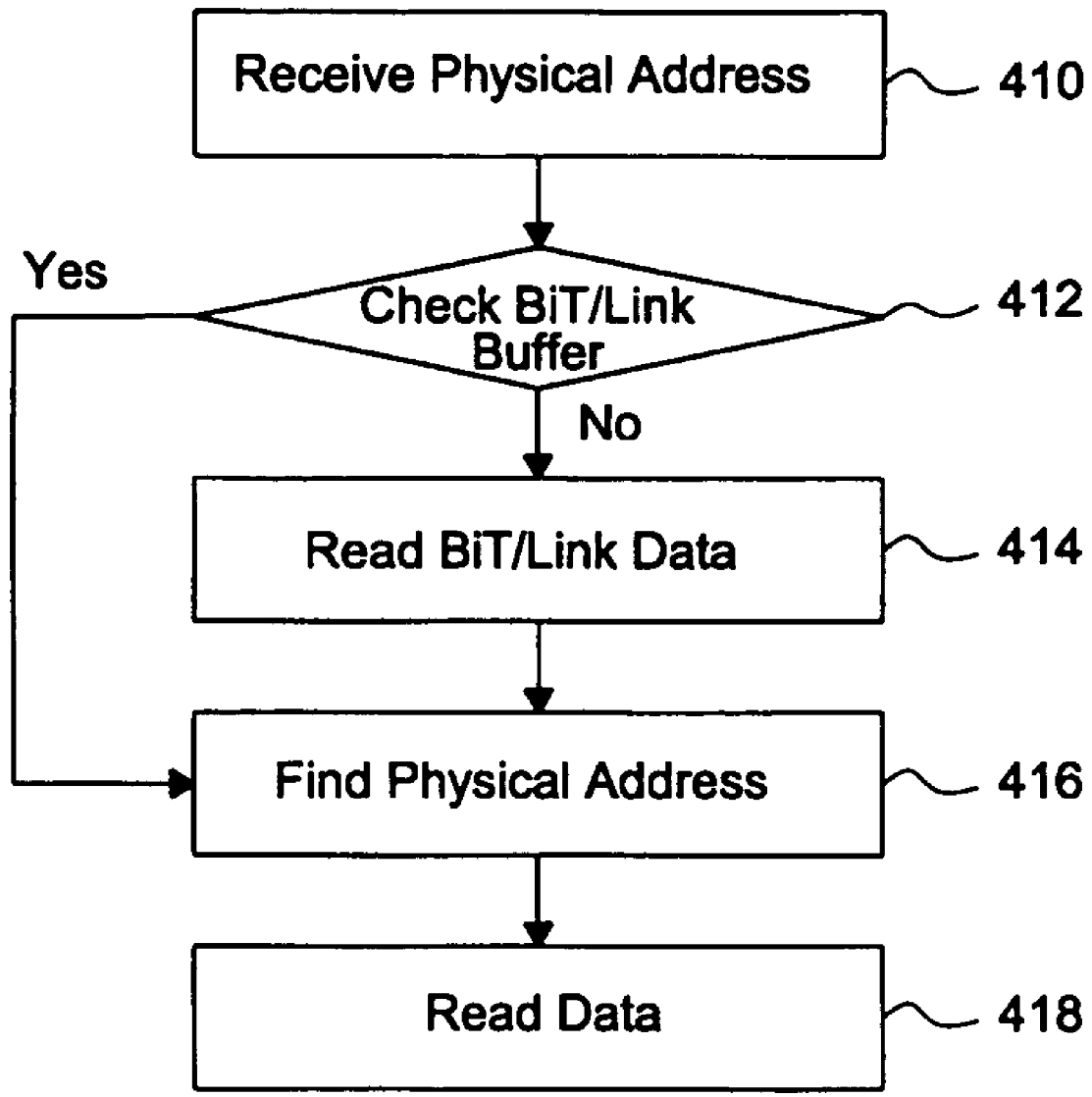
FIG. 10 shows the process of a data read operation of a flash memory.

FIG. 10 shows the sequence of read operation of a flash memory. Physical address is received from a host system (step 410) and physical addresses are examined in BiT/link buffer within a controller that controls the operations of the flash memory (step 412). If information on the logical addresses corresponding to the physical addresses exists in the BiT/link buffer, the sequence proceeds to step 416 and tries to find the physical address based on the information. When any information for the logical addresses is not found in the BiT/link buffer, data is read from the BiT/link table in the flash memory (step 414) and based on this a corresponding physical address is searched (step 416). After physical addresses are found, data is read from memory blocks corresponding to the physical addresses and moved to the I/O buffer (step 418).

Figure 11:
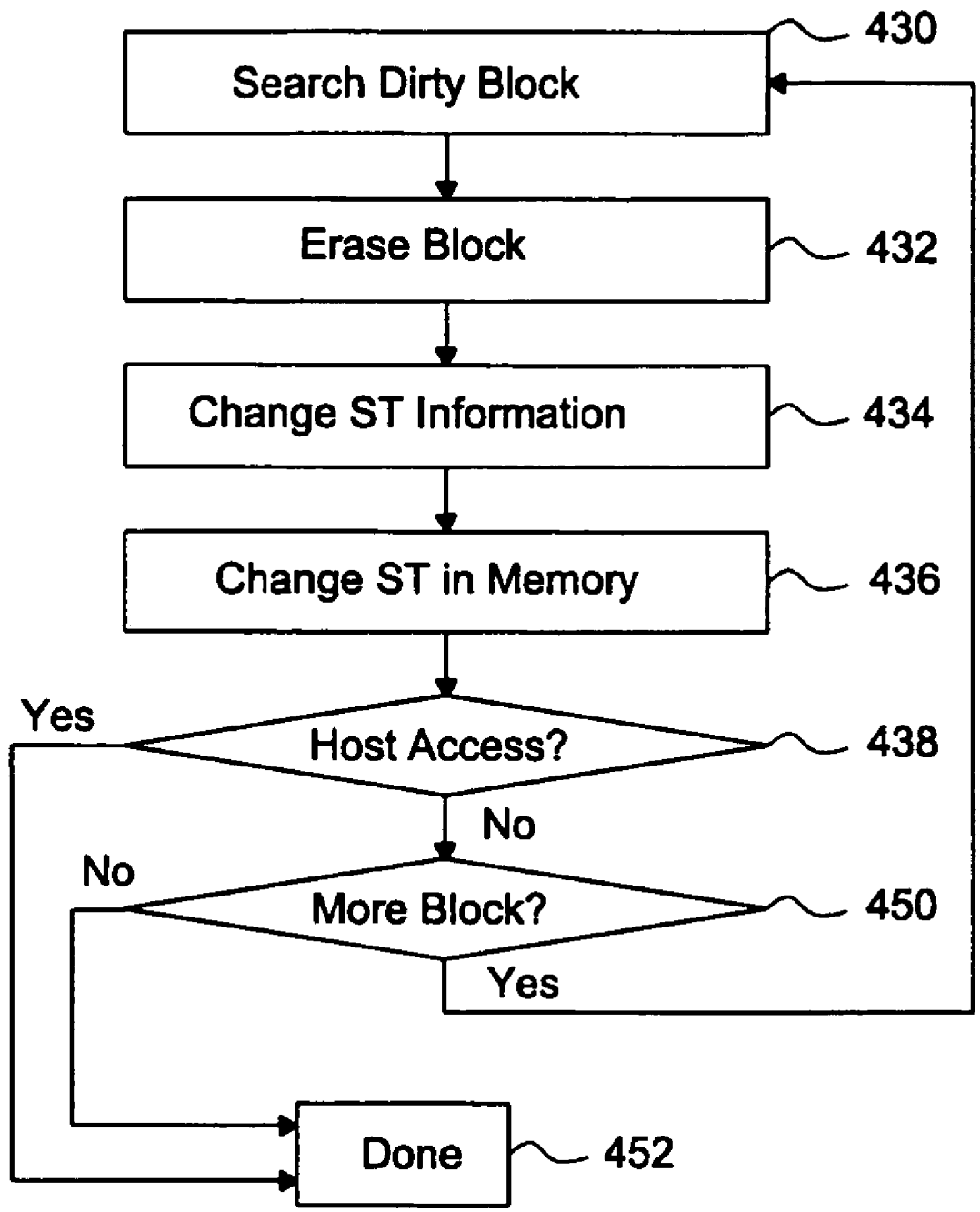
FIG. 11 shows the process of an erase operation of a dirty block in which invalid data is written according to the present invention.

FIG. 11 illustrates a sequence for erasing a dirty block or an invalid data written block. The erase operation of the dirty block performs when a host system (e.g., a card system) is in idle state.

Referring to FIG. 11, dirty blocks are searched (step 430) and the searched blocks are erased (step 432). It is preferable to continue the erase operation until all the dirty blocks stored in the BT buffer of the memory are erased. For example, the amount of data that the BT buffer within the memory of controller reads out from the BT table in the flash memory is one page, and the single page may include block information of four flash memory units. Therefore, the block erase operation performed at the step 432 continues until all the dirty blocks included in the four flash units stored in the ST buffer are erased. ST data of the erased blocks is changed from 'invalid data written' to 'free block' at step 434, and ST buffer information within the memory is changed (step 436). Here, it is preferable to erase the block before the ST information change, because when a power supply is off with the ST information changed but before the corresponding blocks are erased, erroneous ST information can be used in the future. The present invention erases the blocks in advance so that erroneous use of ST information caused by the unexpected power-off can be prevented.

After the change of the ST information within the memory, it is determined that host access exists (step 438), and, if any, the erase operation of the invalid data written blocks is completed (step 452) and the operation proceeds according to the host access. If there is no host access, a determination is made whether remaining blocks exist (step 438). When blocks to be erased remain, the sequence goes back to step 430 and if there remains no block to be erased, the erase operation ends (step 452).

Figure 12:
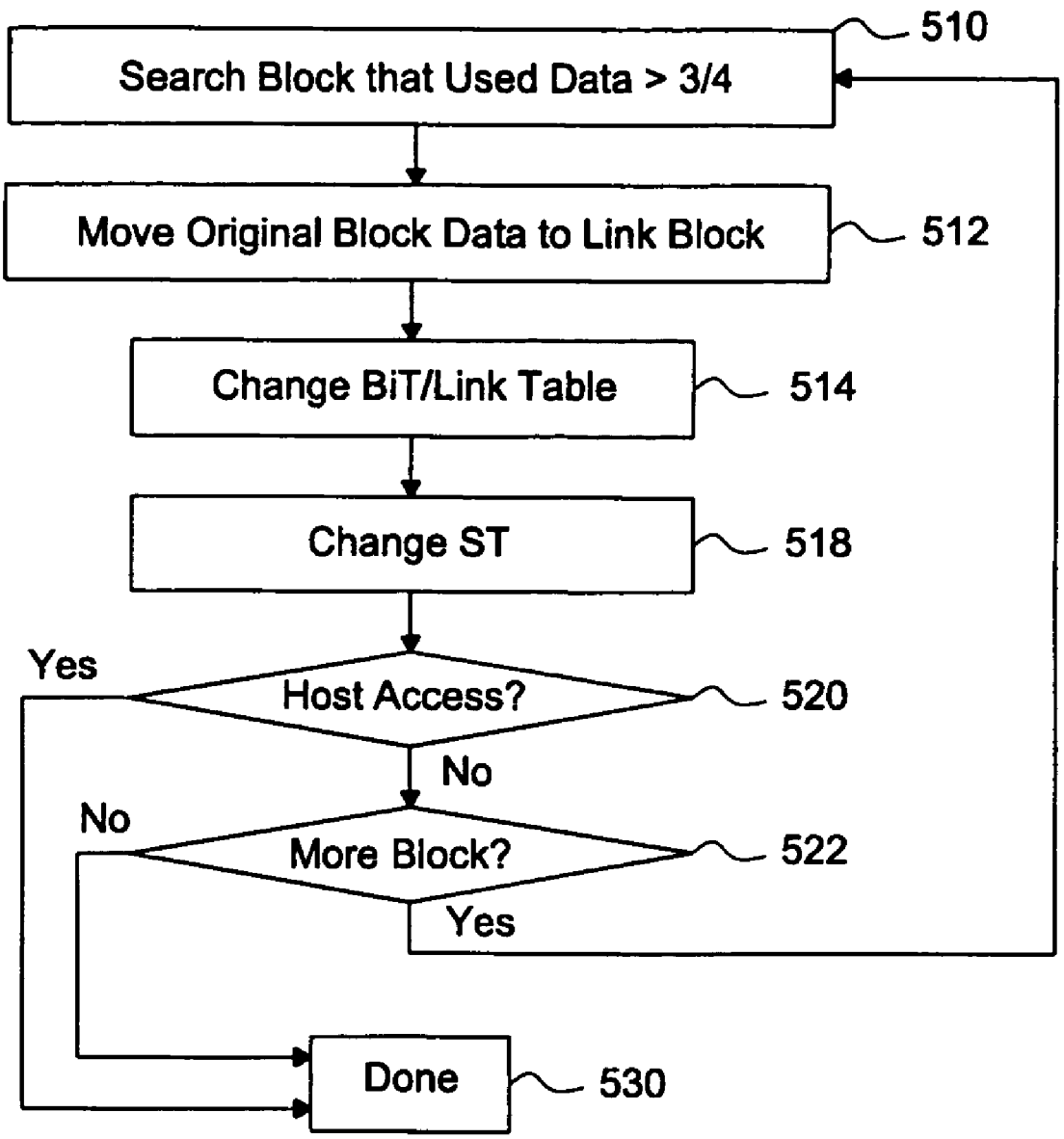
FIG. 12 shows the process of a data moving operation between different blocks according to the present invention.

FIG. 12 illustrates the adding operation of the basic block data and the link block data, which corresponds to the moving process of the basic block data to the link block included in the branch C shown in FIG. 3. It is preferable to proceed the adding operation during when the host system is in an idle state as the erase operation of the invalid data written blocks.

Referring to FIG. 12, data adding or moving operation begins with the step 510 that examines if there exist any blocks in which the use ratio of the used block (e.g., the first link block) is over ¾. It should be noted that the reference value of ¾ is exemplary and hence it is within the scope of the present invention to change the reference value.

For the examined or searched blocks, original block data (i.e., basic block data) is moved to the link block (step 512). BiT/link table for the basic and link blocks is changed (step 515) and ST table in the memory is changed (step 518). It is determined that host access exists (step 520). When the host access is found, the data moving operation is completed (step 530) while if the host access does not occur, it is determined if there are more blocks remained (step 522). When no block remains, the sequence ends (step 530) and for remained blocks the sequence goes back to the step 510 to repeat the previous data moving operation.

Second Embodiment

Figure 13:
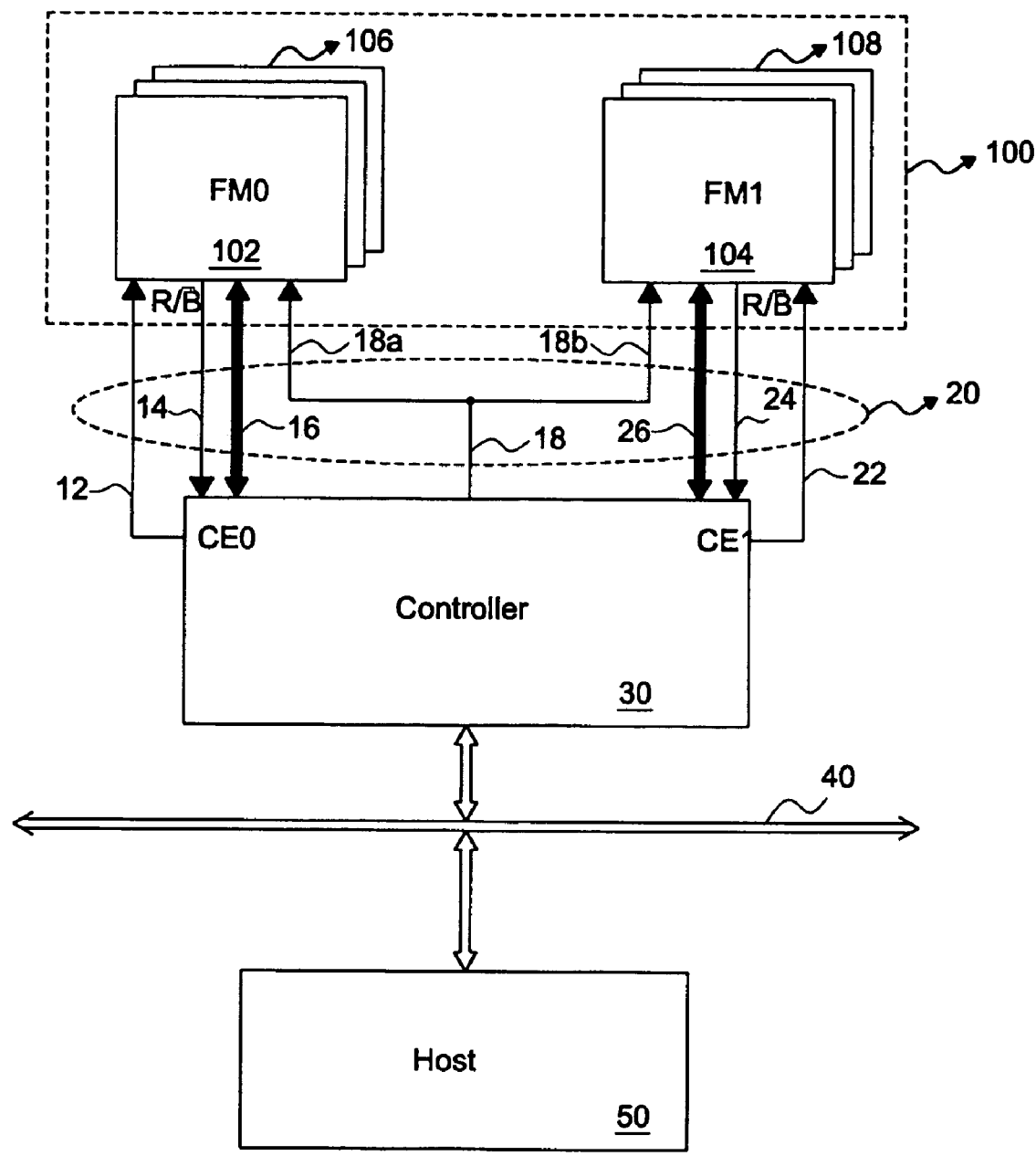
FIG. 13 is a block circuit diagram for showing the connection structure among a flash memory control system, a host system and a flash memory array.

FIG. 13 is a circuit diagram for showing a flash memory control system and its connecting structure to a host system and flash memory array.

A flash memory controller 30 is connected to a flash memory array 100 through a memory bus 20 and to a host system 50 through a host bus 40. The host bus 40 may be a 16-bit data line. The flash memory array 100 includes a plurality of memory banks 106 and 108, and each of the memory banks includes a plurality of memory units 102 and 104. Even though two memory banks are shown in this embodiment, three or more memory banks may be included. The memory units 102 and 104 are e.g., NAND type flash memory in which sixteen memory cells are serially interconnected. The host 50 is OS based processors such as PCs or processor chips of OS-less embedded system. When the host 50 is the OS processor, the flash memory 100 operates as one of the standard peripheral devices and is connected to a system bus of CPU through an I/O interface such as IDE disk drive. The host system 50 transmits address signals, data signals, command signals and control signals to the memory controller 30 through the host bus 40. The host 50 communicates data in sector unit with the memory array 100 through the memory controller 30. One sector may be comprised of 512-byte user data and ECC (Error Encoding and Correction) data.

The memory controller 30 transmits and receives data with the memory array 100 through the memory bus 20 and controls the operations of the memory array 100. The memory bus 20 includes a chip selection signal (CE (Chip Enable) signal) bus 12 for the first flash memory FM0 102, a status signal bus 14, a data bus 16, a chip selection signal bus 22 for the second flash memory FM1 104, a status signal bus 24, a data bus 26 and a control signal bus 18 commonly connected both to the first and second flash memories 102 and 104. The control signal bus 18 includes a fist control signal bus 18a branched and connected to the first flash memory 102 and a second control signal bus 18b connected to the second flash memory 104.

In this embodiment, the chip selection signals CE coming from the memory controller 30 are provided to each of the flash memories 102 and 104 through separate buses 12 and 22, and thus it is possible to enable either multiple flash memory units or a single memory unit. Further, while the control signals to the flash memories 102 and 104 are commonly connected, the data signals are separately provided through separate bus. Accordingly, when data received by the memory controller 30 from the host 50 is two or more sector data for different memory units, the controller 30 simultaneously enable two different memory units addressed to send data, so that two sector data can be concurrently programmed to the enabled memory units. Meanwhile, if the memory controller 30 receives single sector data from the host 50, a single memory unit is enabled and the received sector data is programmed into the enabled one memory unit.

The flash memory controller 30 may include a control chip, a flash control block and the like. Here, the control chip may include SRAM, core, MMU, and circuit devices for the interrupt control, sector buffer, re-mapping and CR interface. The control chip activates the CE signal in accordance with the data size to be transmitted through the flash control block, and sends data to each of the memory banks through ECC in each of the memory banks.

Figure 14:
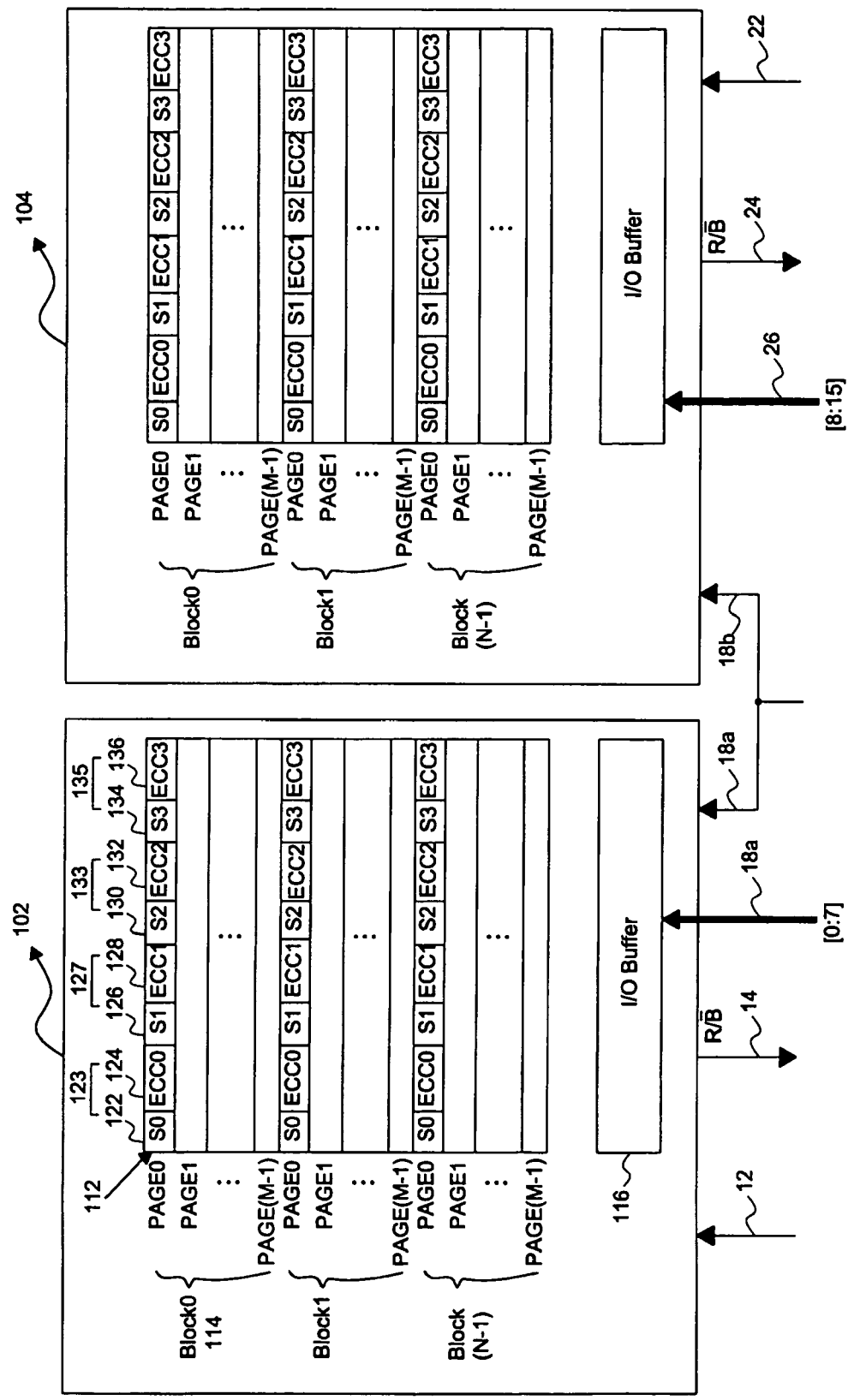
FIG. 14 is a block circuit diagram for showing the data storage structure of a memory unit according to the present invention.

FIG. 14 is a block circuit diagram for showing data storage structure of a memory unit according to the present invention.

A single memory unit 102 includes a plurality of memory blocks 114 (i.e., BLOCK 0, BLOCK 1, . . . , BLOCK [N−1]), and a single memory block includes a plurality of pages 112 (i.e., PAGE 0, PAGE 1, . . . , PAGE [M−1]). Each page includes a number of sectors 123, 127, 131 and 135. Each sector is comprised of user data 122, 126, 130 and 134 and ECC data 124, 128, 132, 136 corresponding thereto. One user data may be 512-byte data and one ECC data is 8-byte. The size of ECC data depends on the construction of the ECC block and is used for the memory controller 30 to perform error detection and correction operations to the user data of each sector. FIG. 14 illustrates 2 k-byte page where each page has four sectors, but if the storage capacity of the memory unit is less than 1 G, it is possible to make the size of each page and each sector to be the same 512-byte. According to an embodiment of the present invention, a single memory block has sixty-four pages and total 2,048 memory blocks may be constructed in a single memory unit.

The control signals provided through the bus 18 includes CLE (Command Latch Enable), ALE (Address Latch Enable), WE (Write Enable), RE (Read Enable), WP (Write Protect) and PRE (Power-on Read Enable) signals. A status signal i.e., R/B (Ready/Busy output) signal is produced in the flash memory and indicates if the flash memory is in ready state or in busy state. The R/B signal pin is connected to e.g., 5V power supply pin so that the R/B signal produced in the flash memory is pulled-up and provided to the memory controller 30. Further, two status registers can be used for supporting the parallel access of two flash memories. Time-multiplexed data signal and the address and command signals are transmitted to the data buses 16 and 18. Data provided to the flash unit 102 from the memory controller 30 is latched at the I/O buffer 116 and then written into the sectors of the corresponding block in the flash unit 102.

When data to be provided to the flash array 100 is two sector data, 'sector 0' data is delivered to the first flash unit 102 through the first data bus 16 and 'sector 1' data is sent to the second flash unit 104 through the second data bus 26. Even-numbered sectors (sector 0, sector 2 and the like) are included in the first memory bank 106 and odd sectors (sector 1, sector 3 and the like) are included in the second memory bank 108. Data provided through a single data bus 16 or 26 is 8-bit data of the 16-bit sector data. When data to be provided to the flash array 100 is one sector data, the sector data is sent to the corresponding flash unit through either one of two data buses (e.g., [0:7] data bus or [8:15] data bus). In order to simultaneously send two sector data, the memory controller may use a 1K buffer per one page for supporting the parallel access of two 512M flash memories or a 4K buffer per one page for the parallel access of two 1 G or 2G flash memories.

Figure 15:
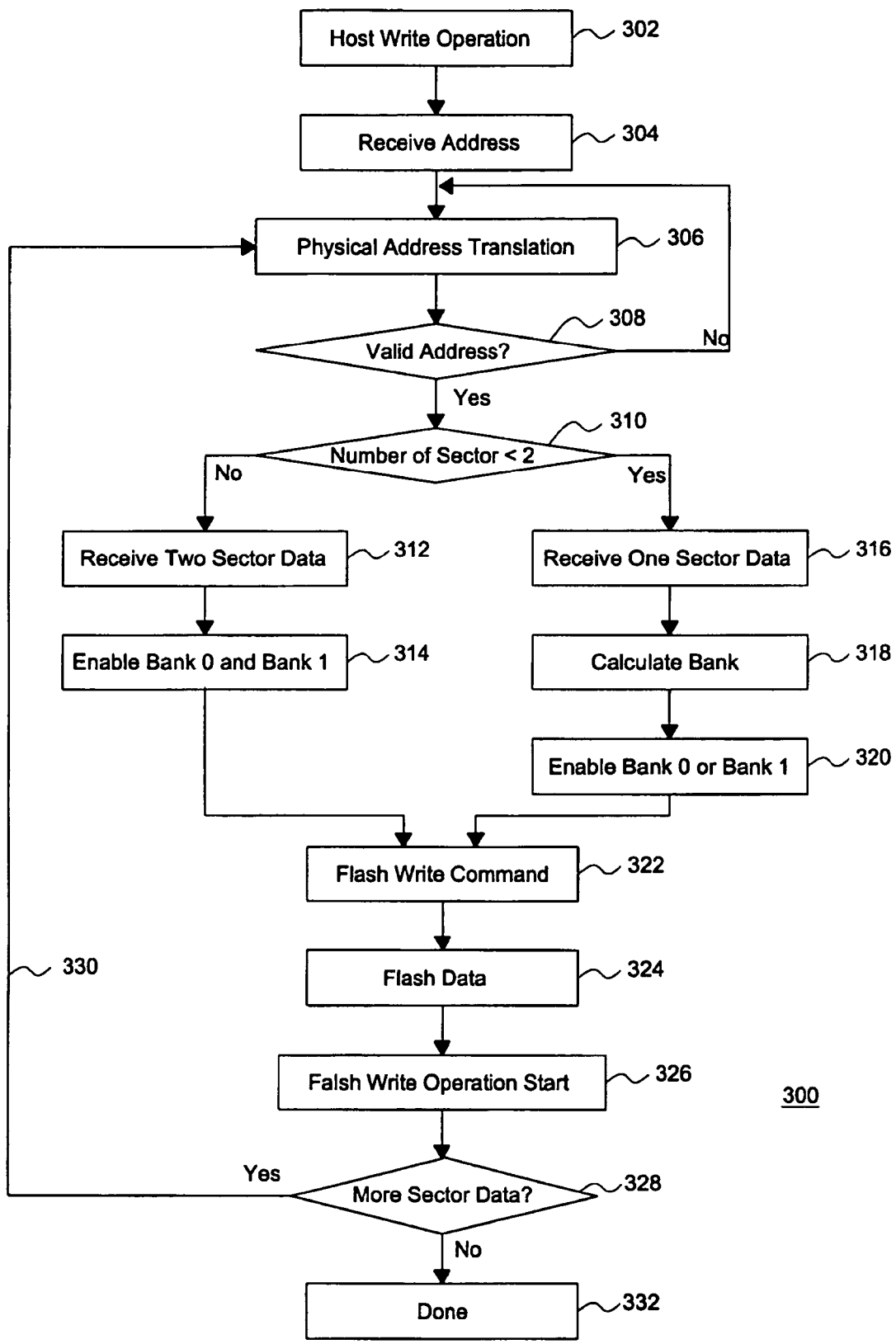
FIG. 15 shows the process of flash memory control according to the present invention.

FIG. 15 is a flow chart for illustrating a control process of a flash memory according to the present invention.

When a host write operation (or write operation) begins (step 302), a host transmits to the memory controller 4-byte address-related input and 1-byte sector number and provides write command or read command (step 304). The memory controller calculates a physical address by using the 4-byte address-related input from the host. The address received from the host is a logical address and this logical address should be translated into corresponding to the physical address to be written into the memory unit (step 306). It is determined whether the translated physical address is valid or not (step 308). If the physical address is not valid, the translation step 306 repeats, while if the physical address is valid, it is determined that the number of sector is less than '2' (step 310). When the sector number is less than '2', the memory controller receives one sector data (step 316) and calculates the bank (step 318). The bank calculation is performed by making 'bank 0' when the least significant bit of the sector address has a value of '0' and by making 'bank 1' when the least significant bit of the sector address is '1'. The 'bank 0' or 'bank 1' is selectively enabled depending upon the bank calculation (step 320), and the sequence proceeds to a flash write operation. In the meantime, if the number of sector is greater than '2' at the determination step 310, the memory controller receives two sector data (step 312) and concurrently enables both 'bank 0' and 'bank 1' (step 314), and then a flash write operation proceeds.

For one or two banks enabled, sequential data input command (80 H command) may be inputted at the flash write command step 322. Upon the 80 H command, flash data is sequentially loaded into the I/O buffer and address is received. Here, the address is received with sequential input of column address and row address after ALE signal being active (step 324). Flash memory data is written into the addressed memory cell while repeating the activation-inactivation of WE signal after making the ALE signal to be inactive state (step 326). Since data is written in a page unit to the memory cell, 512-byte+16-byte=528-byte data is written once at a time at step 326. A determination is made if more sector data to be written into the memory exists (step 328). If data remains to be written, the sequence proceeds to the physical address translation step 306 to repeat the above processing steps, while if no data remains, the write operation ends (step 332). During the write operation, the memory controller may determine if the program cycle terminates or not by examining R/B status signal from the flash memory. The final step 332 may include an additional step to determine the write operation is normal when examined 'I/O 0' data has a value of '0' or determine the program operation has an error when the examined 'I/O 0' data is '1' after giving read status command (70 H command).

In the drawings and specification, there have been disclosed typical preferred embodiments of this invention and, although specific terms are employed, they are used in a generic and descriptive sense only and not for purposes of limitation, the scope of this invention being set forth in the following claims.

What is claimed is:

1. A method for controlling a flash memory, said method including steps of:
receiving a logical address from a host system;
translating the received logical address into a physical address; and
writing data received from the host system into a storage location in the flash memory, said location being addressed by the physical address,
wherein, with the storage location of the addressed flash memory being linked and already written with valid data, the step of writing data includes step for either moving the valid data in the storage location to the linked location if a use ratio of the linked location is greater than a reference value or moving the valid data in the storage location to another linked location if the use ratio of the linked location is less than the reference value.

2. The method as recited in claim 1 further comprising a step for revising a BiT/link table and a ST table for both the storage location and the linked location after the movement of the valid data when the use ratio of the linked location is greater than the reference.

3. The method as recited in claim 1, wherein the reference value is determined that a time in moving data between the locations becomes minimum.

4. A method for controlling operations of flash memory and transmitting data between a host system and the flash memory,
said flash memory including a plurality of memory blocks, each memory block having a plurality of pages/sectors, a data writing operation by the host system to the flash memory being performed in one sector unit, an erase operation to the flash memory being performed in one block unit, and the plurality of memory blocks including basic blocks addressed by physical addresses corresponding to logical addresses transmitted from the host system, first link blocks to which the basic blocks are linked, and second link blocks to which the first link blocks are linked,
said method including steps of:
writing data received from the host system to the flash memory;
moving valid data in the basic block to the first link block when a use ratio of the first link block is greater than a reference value; and
moving valid data in the first link block to the second link block when a use ratio of the first link block is less than the reference value.

5. The method as recited in claim 4 further comprising steps:
revising a BiT/link table and a ST table of the basic and first link blocks, which is performed after the moving step of valid data in the basic block to the first block; and
revising a BiT/link table and a ST table of the basic, first and second link blocks, which is performed after the moving step of valid data in the first block to the second block.

6. An apparatus for controlling a flash memory and transmitting data between a host system and the flash memory,
said flash memory including a plurality of memory blocks, each memory block having a plurality of pages/sectors, a data writing operation by the host system to the flash memory being performed in one sector unit, an erase operation to the flash memory being performed in one block unit, and the plurality of memory blocks including basic blocks addressed by physical addresses corresponding to logical addresses transmitted from the host system, first link blocks to which the basic blocks are linked, and second link blocks to which the first link blocks are linked,
said apparatus including:
means for writing data received from the host system to the flash memory;

means for moving valid data in the basic block to the first link block when a use ratio of the first link block is greater than a reference value; and means for moving valid data in the first link block to the second link block when a use ratio of the first link block is less than the reference value.

7. The apparatus as recited in claim 6 further comprising:

means for revising a BiT/link table and a ST table of the basic and first link blocks, when the valid data in the basic block is moved to the first link block; and means for revising a BiT/link table and a ST table of the basic, first and second link blocks when the valid data in the first link is moved to the second link block.

8. The apparatus as recited in claim 7, wherein the BiT/link table includes a basic block address, a chip address for the basic block, a link block address, a chip address for the link block and data for representing link state.

9. The apparatus as recited in claim 7, wherein the ST table includes data for representing valid data written information and invalid data written information.

10. The apparatus as recited in claim 8, wherein each of the BiT/link table and the ST table is comprised of two memory blocks.

11. The apparatus as recited in claim 6, wherein said means for moving data operates when the host system is in an idle state.

* * * * *